Patented July 19, 1949

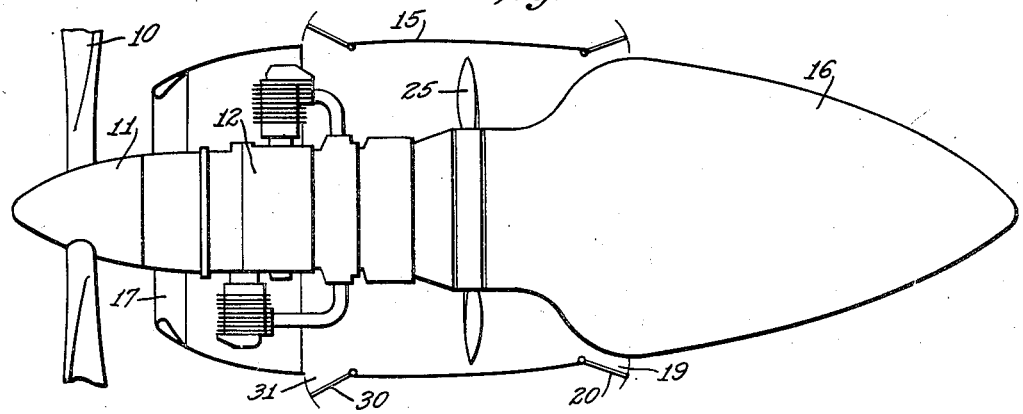
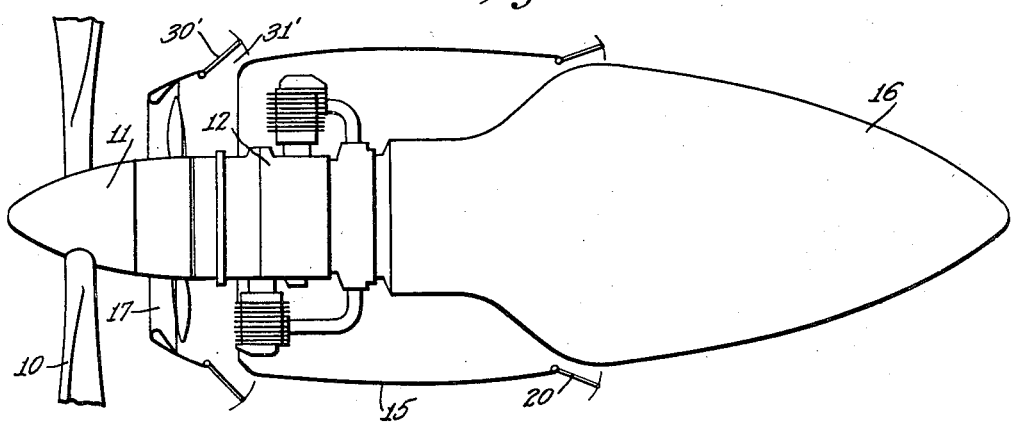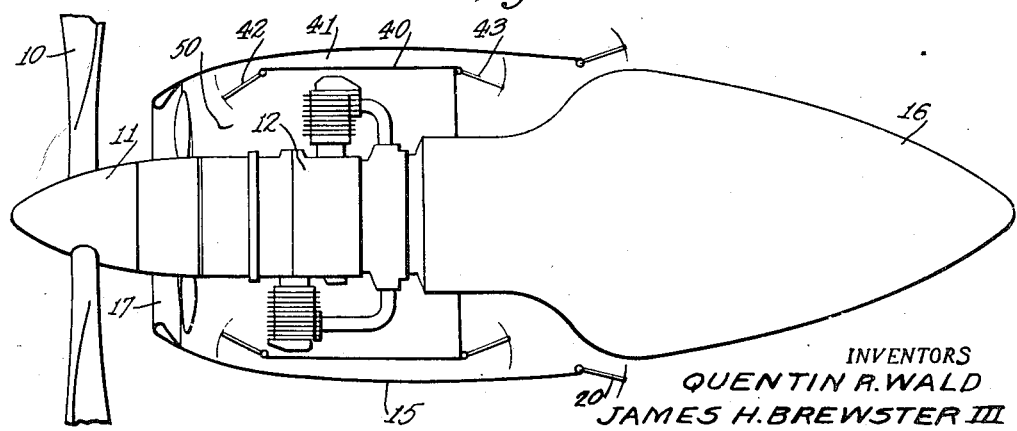

2,476,643

UNITED STATES PATENT OFFICE 2,476,643

BY-PASS SYSTEM FOR COOLING FANS

Quentin Roosevelt Wald, South Glastonbury, and James H. Brewster, III, West Hartford, Conn., assignors to United Aircraft Corporation, East Hartford, Conn., a corporation of Delaware Application July 1, 1944, Serial No. 543,186

7 Claims. (Cl. 230—114)

This invention relates to aircraft, and more particularly, to the engine cooling systems therefor. Aircraft engines are enclosed in a cowl, which is open to the atmosphere at its front and rear ends, so that the travel of the airplane will cause air to enter the cowl, pass over the engine to effect cooling thereof, and then discharge through the rear opening. The amount of cooling air thus provided may be insufficient for some operating conditions unless a booster in the form of a fan is provided within the cowl to force more air therethrough. The fan may be positioned either at the front or rear of the engine. In either case the fan is designed to operate at peak efficiency when handling a predetermined amount of air flow. This amount of air flow may be the quantity of air passing through the cowl at some selected altitude and speed (which may be the best operating altitude of the airplane) with given front and rear cowl openings. It will be understood that at lower altitudes the engine will not require the same amount of cooling air as at higher altitudes, and various methods have been proposed for reducing the quantity of air flowing through the cowl and therefore reducing the amount of air flow handled by the fan. This reduction in air flow means that the fan no longer operates at peak efficiency, since by its design this efficiency is obtained with a larger air flow.

It is therefore one of the principal objects of this invention to provide a system whereby this fan may at all times operate at peak efficiency regardless of the altitude and speed, while at the same time supplying the engine with the proper amount of cooling air. For this purpose, the invention provides means for maintaining the air flow handled by the fan such that the fan operates at all times at peak efficiency while more or less of this air flow is caused to by-pass the engine in accordance with the cooling requirements thereof.

Further objects and advantages of this invention will become apparent in the following detailed description thereof.

In the accompanying drawings,

Fig. 1 is an elevation, largely diagrammatic and with part of the engine cowl broken away, showing one form of this invention.

Fig. 2 is a view similar to Fig. 1, with the fan position changed, showing another form of this invention.

Fig. 3 is a view similar to Fig. 2, showing still another form of this invention.

Referring to Fig. 1, there is disclosed diagrammatically a tractor type of airplane in which a propeller 10 on a spinner 11 is rotated by an engine 12 enclosed within a cowl 15 at the forward end of the main fuselage 16. The cowl is open at its forward end 17 so that the travel of the airplane will cause air to enter the cowl, pass over and cool the engine, and discharge through a rear passage 19, the size of which may be controlled by flaps 20. The size of passage 19 will determine the amount of air flow through the cowl. Even with maximum opening of passage 19, the amount of cooling air passing over the engine due to the movement of the airplane would be insufficient under most operating conditions; and therefore a fan 25 is provided, said fan being driven from the engine and adapted to force the air through the cowl. More air can thus be passed through the cowl than would be the case if the movement of the airplane alone were relied upon to push the air into opening 17.

As stated in the introduction hereto, fan 25 is designed to operate at peak efficiency when it is handling a predetermined air flow. This air flow may be the quantity of air which the fan is called upon to handle at a selected altitude, such as the altitude corresponding to the service ceiling of the airplane. At this altitude the flaps 20 would be adjusted so that the fan handles the air flow at peak efficiency. The flaps 20 would not thereafter be operated to decrease the size of passage 19, but if the ceiling altitude were exceeded the flaps would be opened farther.

Assuming that the flaps 20 have been set so that the fan operates at peak efficiency at a selected altitude, such as the altitude corresponding to the service ceiling of the airplane, it becomes evident that at lower altitudes, where the engine requires less cooling air, the fan would not operate at peak efficiency if the air flow which it handles were reduced by any of the various known means for effecting such reduction. Therefore we provide the following systems whereby the air flow which is supplied to the fan is not reduced below that which enables the fan to operate at peak efficiency regardless of the reduction in altitude, but nevertheless the engine is supplied with no more than its requirements of cooling air.

In one form of this invention shown in Fig. 1, there are provided flaps 30 in the cowl, positioned to the rear of the engine so as to create a passage 31. At the selected altitude where the fan operates at peak efficiency, the flaps 30 are closed and hence passage 31 is closed. When the airplane operates at lower altitude and therefore the engine requires less cooling air, the flaps 30 are opened. Since the total air flow past fan 25 is constant, opening of flaps 30 will cause some of the air to enter through passage 31, thus reducing the amount of air entering through opening 17 and thus reducing the amount of cooling air flowing past the engine. In other words, some of the air flow delivered to the fan is caused to by-pass the engine. Thus the fan continues to handle the same quantity of air which yields maximum efficiency of its operation, while the quantity of cooling air is regulated in accordance with engine requirements.

In Fig. 2 there is illustrated another form of this invention applied to the type of airplane where the fan is located in front of the engine. In this case, in order to by-pass the quantity of air delivered by the fan in excess of engine requirements, a set of flaps 30', similar to flaps 30, may be positioned between the fan and the engine. The flaps 30' open rearwardly to form a rearward or discharge passage 31' whereby more or less of the air flow from the fan may be by-passed before reaching the engine. The fan continues to operate at all times at peak efficiency, delivering a constant quantity of air, but the quantity of air delivered to the engine is regulated to its requirements by by-passing more or less air through passage 31'.

In the Fig. 3 form of the invention, there is provided an auxiliary cowl 40 surrounding the engine within the outer cowl 15. An annular passage 41 is thus formed between the cowls 15 and 40. The fan at the front of the engine may be caused to by-pass more or less air through the passage 41 in accordance with the engine requirements by means of flaps 42 at the front of the inner cowl 40. By moving the flaps 42 inwardly, more of the entrance 50 to the interior of the inner cowl is closed off to force more air through the by-pass. Similarly, moving flaps 42 outwardly permits more air to enter the interior of the inner cowl to cool the engine and less air is by-passed. If desired, the inner cowl 40 may be provided with a set of rear flaps 43 similar to flaps 42.

In all of the above forms, the flaps 30, 30', 42 and 43 may be operated by hand or they may be operated automatically in response to a factor such as altitude by mechanisms which are well-known and therefore not shown.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a device of the character described, a housing for an airplane engine, a fan in said housing and flaps along the housing, some of said flaps being located and adapted to cause air to enter said housing intermediate its ends when said airplane is in flight, whereby the output of said fan may be variably by-passed to control the flow of air from said fan through the main passageway of said housing.

2. In a device of the character described, a housing for an airplane engine, a fan in said housing and flaps along the housing whereby the output of said fan may be variably by-passed to control the flow of air from said fan through the main passageway of said housing, some of said flaps being hinged so that they cause air to enter said housing and others being hinged so that they cause air to escape from said housing when said airplane is in flight.

3. Apparatus for cooling an aircraft engine which is enclosed in a forwardly open cowl and in which an engine-driven fan within and spaced axially in said cowl from said engine is provided to augment flow of air through said cowl past said engine, and wherein said fan is designed and adapted for a given flow at a predetermined engine speed and with a predetermined density of air, comprising an annular series of adjustable flaps associated with said cowl and located intermediate said fan and said engine in the direction of air flow through said cowl for causing a controllable portion of the air moved by said fan to by-pass said engine, whereby such by-passed air will be ineffective to cause additional and undesired cooling of said engine, while this air will be added to the air actually used in cooling said engine to make up the total air acted upon by said fan, so that the fan may be operated at its maximum efficiency, and a second annular series of adjustable flaps downstream as to the flow of air through said cowl from both said fan and said engine for the exhaust of air from the interior of said cowl.

4. Apparatus according to claim 3, wherein said fan is located in said cowl in rear of said engine, and wherein the first-named annular series of adjustable flaps are arranged to control air flow through an annular series of openings in said cowl and are so arranged and hinged in respect to said openings as to open outwardly so as to cause air to enter said cowl from the outside.

5. Apparatus according to claim 3, wherein said fan is located in said cowl in advance of said engine.

6. Apparatus according to claim 3, wherein said fan is located in said cowl in advance of said engine, and wherein the first-named annular series of adjustable flaps are arranged to control air flow through an annular series of openings in said cowl and are so arranged and hinged in respect to said openings as to open outwardly so as to cause air to flow from the inside to the outside of said cowl through said openings.

7. Apparatus according to claim 3, wherein said fan is located in said cowl in advance of said engine, and comprising in addition, an auxiliary cowl within the first-named cowl and surrounding said engine, said auxiliary cowl terminating short of said first-named cowl in a forward direction toward said fan and providing a by-pass passage for some of the air acted upon by said fan past said engine, and wherein the first-named annular series of adjustable flaps controls air flow through said by-pass passage.

QUENTIN ROOSEVELT WALD.
JAMES H. BREWSTER, III.

REFERENCES CITED

The following references are of record in the file of this patent:

UNITED STATES PATENTS

| Number | Name | Date |
| --- | --- | --- |
| 1,181,873 | Gue et al. | May 2, 1916 |
| 1,376,178 | Wagenseil | Apr. 26, 1921 |
| 1,386,493 | Guyot | Aug. 2, 1921 |
| 1,598,867 | Lundelius | Sept. 7, 1926 |
| 1,691,593 | Tank et al. | Nov. 13, 1928 |
| 2,077,708 | Morse | Apr. 20, 1937 |
| 2,129,826 | Dintilhac | Sept. 13, 1938 |
| 2,146,523 | Bleecker et al. | Feb. 7, 1939 |
| 2,160,281 | Price | May 30, 1939 |
| 2,330,622 | Ramshorn | Sept. 28, 1943 |
| 2,340,396 | McDonnell | Feb. 1, 1944 |